May 10, 1949.  A. P. GUBRUD  2,470,029
GRADE INDICATOR
Filed Feb. 11, 1946
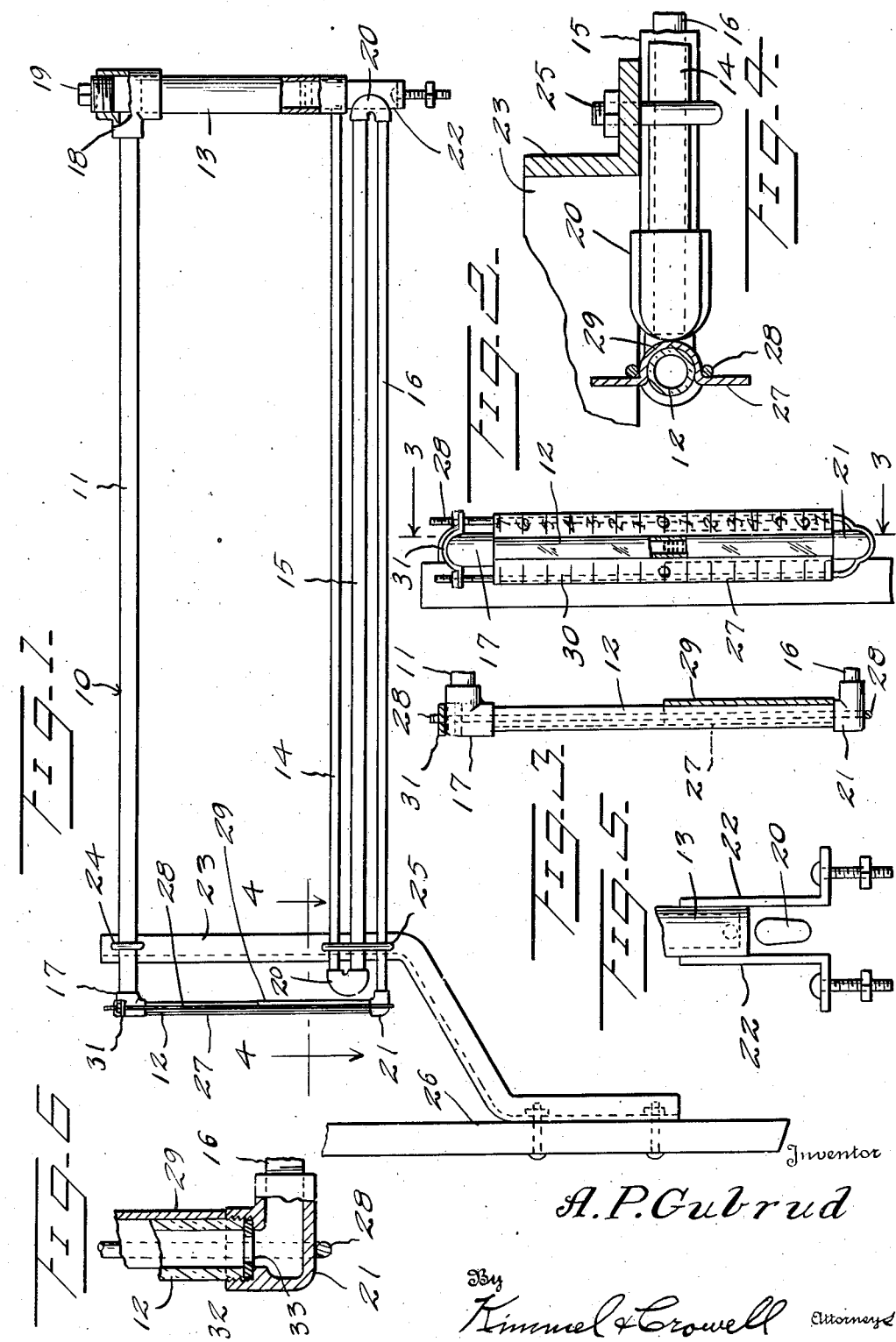
Inventor
A. P. Gubrud
By
Kimmel & Crowell  Attorneys Patented May 10, 1949

2,470,029

UNITED STATES PATENT OFFICE 2,470,029

GRADE INDICATOR

Adolph P. Gubrud, Hudson, S. Dak.

Application February 11, 1946, Serial No. 646,935

2 Claims. (Cl. 33—209)

This invention relates to improvements in grade indicators, and more particularly to the type of grade indicator which is mounted on a vehicle for determining the grade of a road or other surface.

It is an object of this invention to provide a liquid level grade indicator which may be readily attached to a vehicle and has a scale whereby the grade of the surface may be readily observed.

Another object of this invention is to provide a level determining device which may be mounted on a vehicle and which is so constructed to eliminate surging of the liquid in the indicator which is caused by stopping, starting, and changing speed of the vehicle on which the device is mounted, the surging being prevented by providing lengths of tubing to afford much friction resistance to movement of the liquid and a fixed restrictor below the liquid level indicator.

To the foregoing objects, and others which may hereinafter more fully appear, the invention consists of the novel construction, combination and arrangement of parts, as will be more specifically referred to and illustrated in the accompanying drawings, but it is to be understood that changes, variations and modificatitons may be resorted to which fall within the scope of the invention as claimed.

In the drawings:

Figure 1 is a side elevation, partly in section, of a level indicator constructed according to an embodiment of my invention, Figure 2 is a rear end view of this indicator, Figure 3 is a section taken on the line 3—3 of Figure 2, Figure 4 is a horizontal section taken on the line 4—4 of Figure 1, Figure 5 is a fragmentary front end view of the lower end of this device, and Figure 6 is a fragmentary vertical section of the rear end of the indicator.

Referring to the drawings, the numeral 10 designates generally a liquid level grade indicating device constructed according to an embodiment of my inventiton. The indicator 10 is made with an endless tube which is formed with an upper horizontal tube 11, vertical end tubes 12 and 13 and a series of lower horizontal tubes 14, 15 and 16. The upper tube 11 is connected to the rear vertical tube 12 by an elbow 17, and to the forward tube 13 by a T-fitting 18. The tube 13 is threaded into one end of the cross arm of the T-fitting 18, and a plug 19 is threaded into the other cross arm. The plug 19 may be readily removed for filling the tubes with liquid to the desired level. The lower horizontal tubes 14 and 16 are of a reduced diameter relative to the other tubes in order to present more friction to the liquid when the liquid is agitated or caused to flow within the tubes. This added friction will assist in reducing the surging of the liquid during such times when the vehicle, to which the device is attached, is accelerating or when there is a sharp change of grade.

The tube 14 is fixed to the forward tube 13 and extends rearwardly nearly to the rear tube 12, and it is connected to the tube 15 by a U-shaped reducer fitting 20. The tube 15 extends forwardly to a point below the vertical tube 13 where it is connected to tube 16 by another U-shaped reducer coupling 20. The tube 15 has a cross section twice that of each of the tubes 14 and 16 whereby the combined volume of the tubes 14, 15 and 16 provides a liquid reservoir and surge chamber for the indicating device 10. The tube 16 then extends rearwardly and is connected to the rear vertical tube 12 by an elbow 21.

Angled brackets 22 are welded to, or otherwise suitably attached to, the forward tube 13 for attaching the forward end of the indicator 10 to a vehicle. Another angle bracket 23 is secured to the rear end of indicator 10 by U-bolts 24 and 25 which fasten about the horizontal tubes. The lower end of the bracket 23 is fixed to some suitable part of the vehicle as at 26.

The rear tube 12 is made of a transparent material, as glass, so that the level of the liquid may be easily viewed by an operator of the vehicle.

An indicator plate or card 27 is fixed to the device 10 by a U-bolt 28. The plate 27 is formed of a flat sheet having a semi-circular recess 29 centrally of the width of the plate extending halfway up the length thereof, which is adapted to fit about the forward side of the tube 12. The center of the plate 27 is open beyond the groove 29 providing a pair of upstanding extensions 30 one on each side of the tube 12. The U-bolt 28 engages about the lower fitting 21, along the outside of the groove 29, and engages through a plate or bracket 31 above the fitting 17. Marked graduations are fixed on the rear side of the plate 27 to indicate the grade of the surface and preferably these graduations indicate the percentage grade, though other indicia indicating the grade in other units may be used. The 0 or level mark is made halfway up the plate 27 so that inclinations up or down may be indicated readily by the liquid level in the tube 12.

A washer 32 having a restricted opening 33 is fixed below the tube 12 in the fitting 21 to restrict the flow of the liquid into and out of the tube 12 thereby further preventing surging of the level in the tube 12 and making the level in the tube 12 more steady for accurate grade indication.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What I claim is:

1. A grade indicator comprising an endless tubular member including a front vertical tube, a transparent rear vertical tube, a horizontal tube between the upper ends of said vertical tubes, a reduced diameter horizontal tube connected at one end to the lower end of said front tube, a reduced diameter horizontal tube connected at one end to the lower end of said rear tube parallel to said first reduced tube, a graduated level indicating card on said transparent tube, and a horizontal connecting tube between the free end of said reduced diameter tubes, said latter tube being of a diameter greater than said reduced tubes.

2. A grade indicator comprising an endless tubular member including a front vertical tube, a transparent rear vertical tube, a horizontal tube between the upper ends of said vertical tubes, a reduced diameter horizontal tube connected at one end to the lower end of said front tube, a reduced diameter horizontal tube connected at one end to the lower end of said rear tube parallel to said first reduced tube, a graduated level indicating card on said transparent tube, a horizontal connecting tube between the free end of said reduced diameter tubes, said latter tube being of a diameter greater than said reduced tubes, and restrictor in said transparent tube at the lower end thereof.

ADOLPH P. GUBRUD.

REFERENCES CITED

The following references are of record in the file of this patent:

UNITED STATES PATENTS

| Number | Name | Date |
|---|---|---|
| 1,970,883 | Bryant | Aug. 21, 1934 |
| 2,379,350 | Gubrud | June 26, 1945 |

FOREIGN PATENTS

| Number | Country | Date |
|---|---|---|
| 336,310 | France | Jan. 11, 1904 |
| 514,040 | Germany | Dec. 6, 1930 |